(12) United States Patent
Nagaishi (10) Patent No.: US 6,539,785 B1
(45) Date of Patent: Apr. 1, 2003

(54) DIAGNOSIS SYSTEM FOR VALVE SYSTEM OF INTERNAL COMBUSTION ENGINE

(75) Inventor: Hatsuo Nagaishi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/296,236

(22) Filed: Apr. 22, 1999

(30) Foreign Application Priority Data

Apr. 24, 1998 (JP) ............................................. 10-115501

(51) Int. Cl.[7] ............................................... G01M 15/00
(52) U.S. Cl. ...................... 73/118.2; 73/117.3
(58) Field of Search ............................... 73/116, 117.2, 73/117.3, 118.1, 118.2, 119 R (56) References Cited

U.S. PATENT DOCUMENTS

| | | | | |
|---|---|---|---|---|
| 4,870,937 A | * | 10/1989 | Sanbuichi et al. | 73/118.2 |
| 4,922,879 A | * | 5/1990 | Kaji et al. | 73/118.2 |
| 5,339,681 A | * | 8/1994 | Sekozawa et al. | 73/118.2 |
| 5,544,523 A | * | 8/1996 | Uchiyama et al. | 73/118.2 |
| 5,622,144 A | | 4/1997 | Nakamura et al. | 123/90 |
| 5,644,073 A | * | 7/1997 | Matsuno et al. | 73/117.3 |
| 5,669,341 A | | 9/1997 | Ushirono et al. | 123/90 |
| 5,675,080 A | * | 10/1997 | Wada | 73/118.1 |
| 5,696,321 A | * | 12/1997 | Igarashi et al. | 73/202.5 |
| 5,714,683 A | * | 2/1998 | Maloney | 73/117.3 |
| 5,765,372 A | | 6/1998 | Mitobe et al. | 60/30 |
| 5,897,597 A | * | 4/1999 | O' Daniel | 73/117.3 |
| 5,918,582 A | * | 7/1999 | Itoyama et al. | 73/118.2 |
| 5,957,108 A | * | 9/1999 | Kato | 73/118.1 |
| 6,035,835 A | * | 3/2000 | Shigihama et al. | 73/117.3 |
| 6,070,462 A | * | 6/2000 | Igarashi et al. | 73/204.22 |
| 6,234,015 B1 | * | 5/2001 | Hamada et al. | 73/204.22 |

FOREIGN PATENT DOCUMENTS

| | | |
|---|---|---|
| DE | 19508505 | 9/1995 |
| DE | 19634136 | 2/1997 |
| JP | 6-317117 | 11/1994 |
| JP | 7-197846 | 8/1995 |
| JP | 7-301105 | 11/1995 |
| JP | 7-301106 | 11/1995 |
| JP | 7-324609 | 12/1995 |
| JP | 8-254126 | 10/1996 |

* cited by examiner

Primary Examiner—Eric S. McCall
(74) Attorney, Agent, or Firm—Foley & Lardner (57) ABSTRACT

A diagnosis system for a valve system of an internal combustion engine includes an airflow meter which detects an intake air flow rate fed to the engine. A control unit coupled to the airflow meter calculates an accumulated value of an intake airflow rate during a particular period by each cylinder and diagnoses the valve system of the engine on the basis of the calculated accumulated value. Therefore, the diagnosis system executes an accurate diagnosis by each cylinder without further providing sensors.

20 Claims, 11 Drawing Sheets

DIAGNOSIS SYSTEM FOR VALVE SYSTEM OF INTERNAL COMBUSTION ENGINE

BACKGROUND OF THE INVENTION

The present invention relates to a diagnosis system for a valve operating system of an internal combustion engine.

A variety of variable valve operating systems have been proposed. Japanese Patent Provisional Publications No. 7-197846 and No. 8-254126 disclose a variable valve operating system arranged to control a closing timing of intake valves. A Japanese Patent Provisional Publication No. 7-301106 discloses a variable-valve operation-angle control system arranged to variably control an operation angle during a period from opening to closing of intake valves and to control opening and closing timings of exhaust valves. Further, Japanese Patent Provisional Publications No. 7-301105 and No. 7-324609 disclose an electromagnetic type variable valve operating system arranged to properly control opening and closing timings and operation angles of intake and exhaust valves by employing electromagnetic force and springs. Furthermore, a Japanese Patent Provisional Publication No. 6-317117 discloses a diagnosis system which diagnoses a variable valve operating system on the basis of a level of an intake air pulsation of an engine.

SUMMARY OF THE INVENTION

However, these conventional variable valve operating systems have been arranged to mainly diagnose the normality thereof by detecting the operating conditions of intake and exhaust valves through further added sensors therefor. Furthermore, the last conventional diagnosis system has been required to be more stable in diagnosis against various changes of the engine.

It is an object of the present invention to provide a diagnosis system for a variable valve operating system of an internal combustion engine, which diagnosis system enables accurate diagnosis of the valve operating systems of intake and exhaust valves without employing another sensors.

A diagnosis system according to the present invention is for a valve system of an internal combustion engine and comprises an airflow meter and a control unit. The airflow meter is disposed in an intake passage of the engine. The airflow meter detects an intake air flow rate of the engine and outputs a signal indicative of the intake air flow rate. The control unit is coupled to the air flow meter. The control unit calculates an accumulated value of an intake airflow rate during a predetermined period and diagnoses the valve system of the engine on the basis of the calculated accumulated value.

BRIEF DESCRIPTION OF THE DRAWINGS

In the drawings, like reference numerals designate like parts and elements throughout all figures, in which.

DETAILED DESCRIPTION OF THE INVENTION

Referring to FIGS. 1 to 4 and 8A to 11E, there is shown a first embodiment of a diagnosis system for a valve unit of an internal combustion engine 1 in accordance with the present invention. The valve unit includes intake and exhaust valves 12 and 14 and valve operating system 13 and 15 of the intake and exhaust valves 12 and 14.

Figure 1:
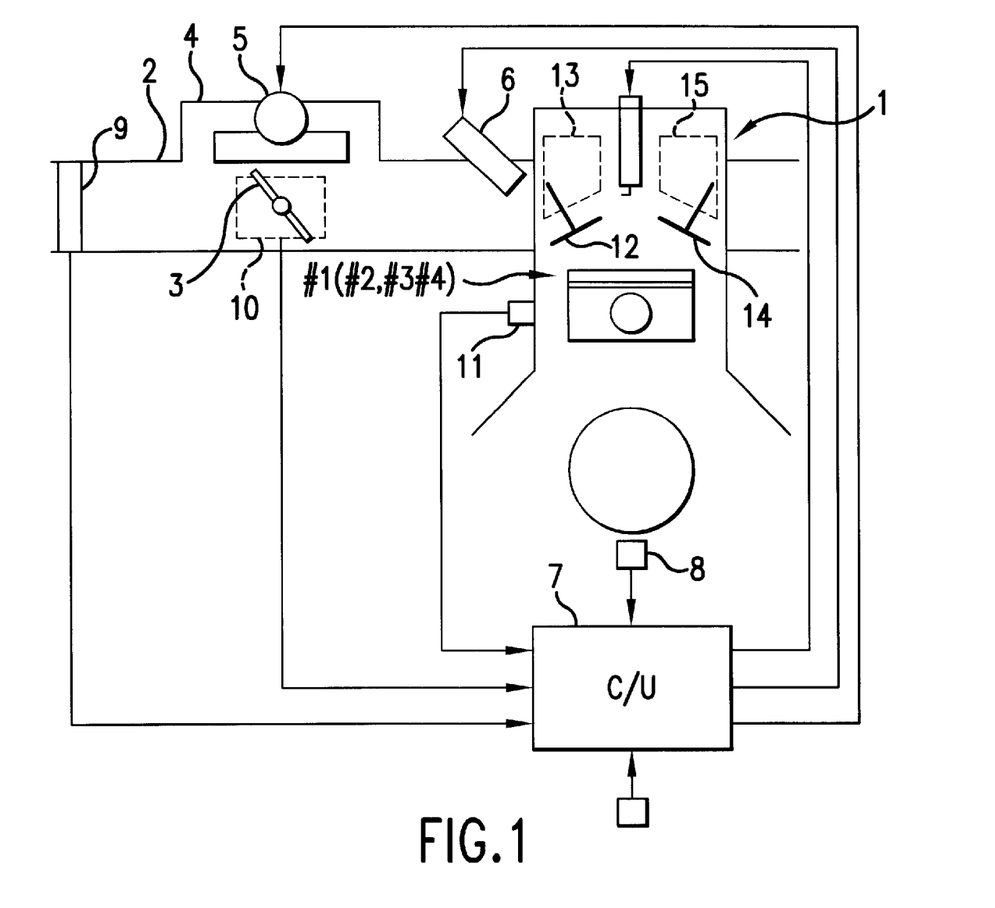
FIG. 1 is a schematic view showing a first embodiment of an internal combustion engine including a variable valve operating system and a diagnosis system thereof according to the present invention.

As shown in FIG. 1, a throttle valve 3 is disposed in an intake passage 2 of the internal combustion engine 1 of an in-line four cylinder engine. An auxiliary bypass passage 4 is connected to the intake passage 2 so as to bypass the throttle valve 3. An auxiliary air control valve 5 of an electromagnetic type is installed in the auxiliary air passage 4. The auxiliary air control valve 5 is an electromagnetic ON/OFF valve whose opening degree is varied according to a duty ratio. More specifically, the auxiliary air control valve 5 is connected to a control unit 7 so as to be controlled by a duty control executed by the control unit 7.

In case that the internal combustion engine 1 is of a non-throttle engine such as a miller cycle engine arranged to control intake air amount without a throttle valve while sucking intake air in atmospheric state by controlling the open-and-close timing of intake valves, the throttle valve 3, the auxiliary air passage 4, and the auxiliary air control valve 5 may be omitted.

An electromagnetic type fuel injector 6 is installed in each intake port of each cylinder of the engine 1. The fuel injector 6 is installed to each cylinder #1, #2, #3, #4 of the engine 1 and coupled to the control unit 7 so as to be controlled thereby.

The control unit 7 is coupled to various sensors and receives signals indicative of operating conditions of the engine 1 therefrom. More specifically, a crankangle sensor 8 is installed to the engine 1 and outputs a reference signal (Ref) at predetermined crankangle and a unit angle signal by every unit crankangle. Since the engine 1 of the first embodiment is a four-cylinder engine, the crankangle sensor 8 outputs the reference signal at 180° crankangle (ca) to the control unit 7. The control unit 7 obtains each piston position in each cylinder #1, #2, #3, #4 on the basis of a signal from the crankangle sensor 8 and calculates an engine rotation speed Ne of the engine 1.

An airflow meter (AFM) 9 is disposed in the intake passage 2. The airflow meter 9 detects an intake air flow rate Qs of the engine 1 and outputs a signal indicative of the intake air flow rate to the control unit 7. A throttle sensor 10 is disposed in the vicinity of the throttle valve 3. The throttle sensor 10 detects an opening degree TVO of the throttle valve 3 and outputs a signal indicative of the opening degree TVO to the control unit 7. A water temperature sensor 11 is installed in an engine block of the engine 1. The water temperature sensor 11 detects a cooling water temperature Tw of the engine 1 and outputs a signal indicative of the cooling water temperature Tw to the control unit 7. The airflow meter 9 corresponds to intake air flow rate detecting means.

The control unit 7 calculates a basic fuel injection quantity Tp on the basis of the engine rotation speed Ne and determines a final fuel injection quantity Ti by correcting the basis fuel injection quantity Tp according to the cooling water temperature Tw and so on. Further, the control unit 7 outputs a valve opening drive signal having a pulse width corresponding to the final fuel injection quantity Ti to the fuel injector 6 at a timing synchronized with the rotation of the engine Further, the engine 1 comprises a first variable valve control system 13 for the intake valve 12 for each cylinder #1, #2, #3, #4 of the engine 1. The first variable valve control system 13 controls a valve opening-and-closing characteristics including an opening-and-closing timing (phase angle), a lift amount and an operation angle for each cylinder #1, #2, #3, #4. The variable valve control system 13 is of a so-called EMV employing a magnetic force without using a cam. It will be understood that the construction of the variable valve control system is not limited to this and may employ other conventional constructions.

Similarly, the engine 1 comprises a second variable valve control system 15 for the exhaust valve 14 for each cylinder #1, #2, #3, #4. The second variable valve control system 15 controls a valve opening-and-closing characteristics including an opening-and-closing timing (phase angle), a lift amount and an operation angle for each cylinder #1, #2, #3, #4. The second variable valve control system 15 is also of a so-called EMV employing an electromagnetic force without using a cam. It will be understood that the construction of the variable valve control system is also not limited to this and may employ other conventional constructions.

The control unit 7 determines the opening-and-closing characteristics of the intake valves 12 and the exhaust valves 14 on the basis of the engine operating condition including an engine load represented by the intake air flow rate Qs and the fuel injection quantity Tp, the engine rotation speed Ne, and the engine cooling water temperature Tw. Further, the control unit 7 controls the valve operating systems 13 and 15 so that the inlet and exhaust valves 12 and 14 perform the calculated opening-and-closing characteristics. The control unit 7 further executes a diagnosis as to whether the variable valve operating systems 13 and 15, the intake valves 12 and the exhaust valves 14 are normally operated or not.

Figure 2:
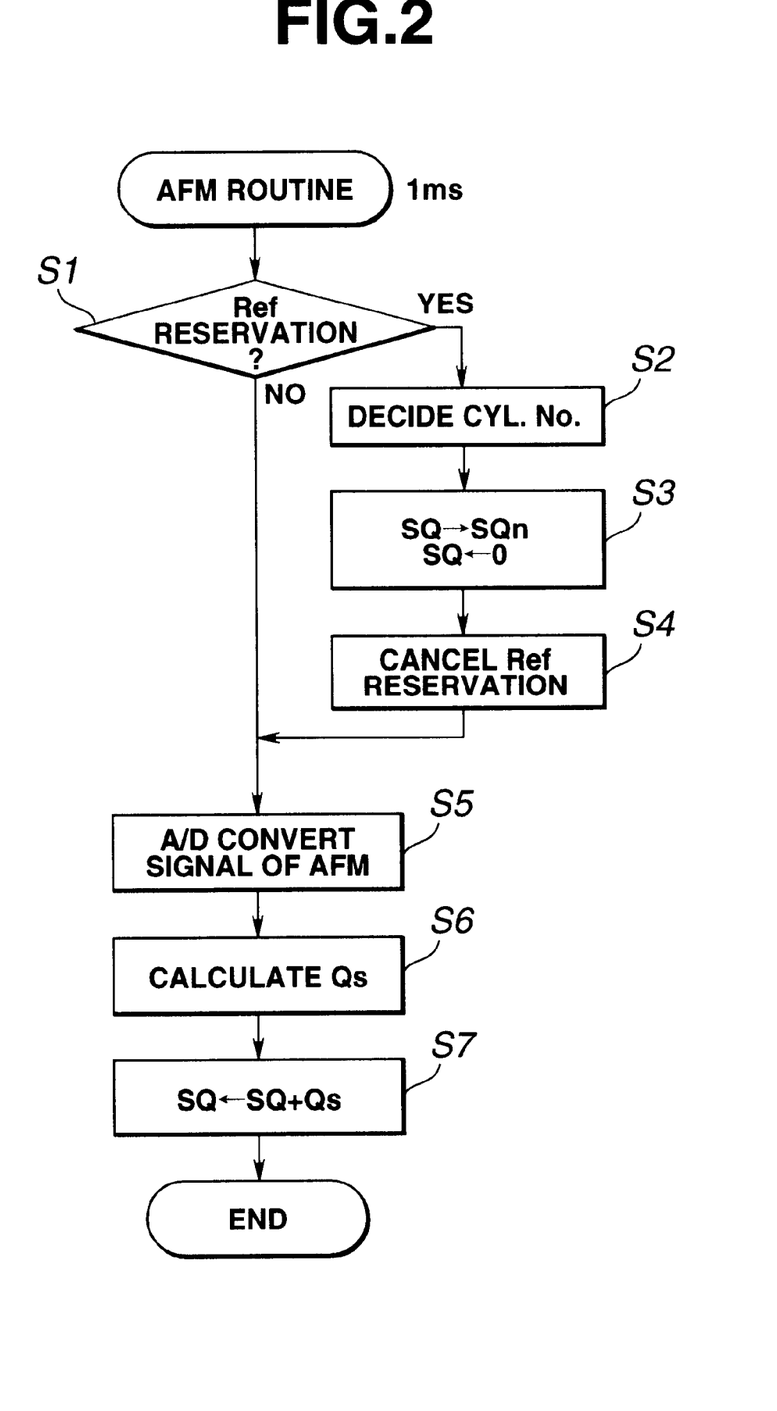
FIG. 2 is a flowchart for calculating an accumulated value SQn of a particular period corresponding a cylinder of the first embodiment.

With reference to flowcharts of FIGS. 2 and 3, the diagnosis control of the variable valve operating systems 13 and 15 will be discussed. The control unit 7 has functions of the intake air flow rate accumulating means and the diagnosing means in the form of software therein. The routine of the flowchart of FIG. 2 is implemented every 1 msec.

At a step S1, the control unit 7 decides whether the reference signal Ref is reserved or not. This reservation of the reference signal Ref is achieved by executing a routine of a flowchart shown in FIG. 5 when the control unit 7 receives the reference signal Ref from the crankangle sensor 8. When the decision at the step S1 is affirmative, the routine proceeds to a step S2. When the decision at the step S1 is negative, the routine jumps to a step S5.

At a step S2, the control unit 7 selects one cylinder of the engine 1 according to the reference signal Ref. More specifically, a width of an ON signal of the reference signal Ref by each cylinder is differentiated so that the control unit 7 can distinguish a number of each cylinder.

At a step S3, the control unit 7 sets SQn at an accumulated value SQ which is an accumulated value of the detection value Qs of the airflow meter 9 during a particular period corresponding to the selected cylinder #n (SQ→SQn). Further, the control unit 7 resets the accumulated value SQ at 0 (SQ←0). The detection value Qs and the accumulated value SQ show values by each cylinder #1, #2, #3, #4, that is, (intake air flow rate/cylinder) and (accumulated value of air flow amount/cylinder). A reference n of SQn denotes a cylinder number.

At a step S4, the control unit 7 cancels the reservation of the reference signal Ref.

At a step S5, the control unit 7 A/D converts an analog voltage signal into a digital value.

At a step S6, the control unit 7 calculates the detected intake air flow rate Qs by means of a linearization treatment using the digital value obtained at the step S5 and a table previously stored in the control unit 7.

At a step S7, the control unit 7 accumulates the value Qs processed at the step S6 for a particular period (during Ref signal). More specifically, the control unit 7 obtains the accumulated value SQ from the following equation (1):

Accumulated Value $SQ$=Holding Value $SQ$ (previous value)+$Qs$ (1)

After the execution of the step S7, the routine returns to a start step of this AFM routine for the next routine by each 1 msec.

That is, during the particular period from the input of the reference signal Ref to the next input of the reference signal Ref, during when the detecting value Qs (corresponding to the intake air flow rate) is affected by the change of the opening-and-closing characteristics of the inlet and exhaust valves 12 and 14 of the particular cylinder #n, the control unit 7 calculates the accumulated value SQn during the particular period by accumulating the detection value Qs of the airflow meter 9.

Figure 3:
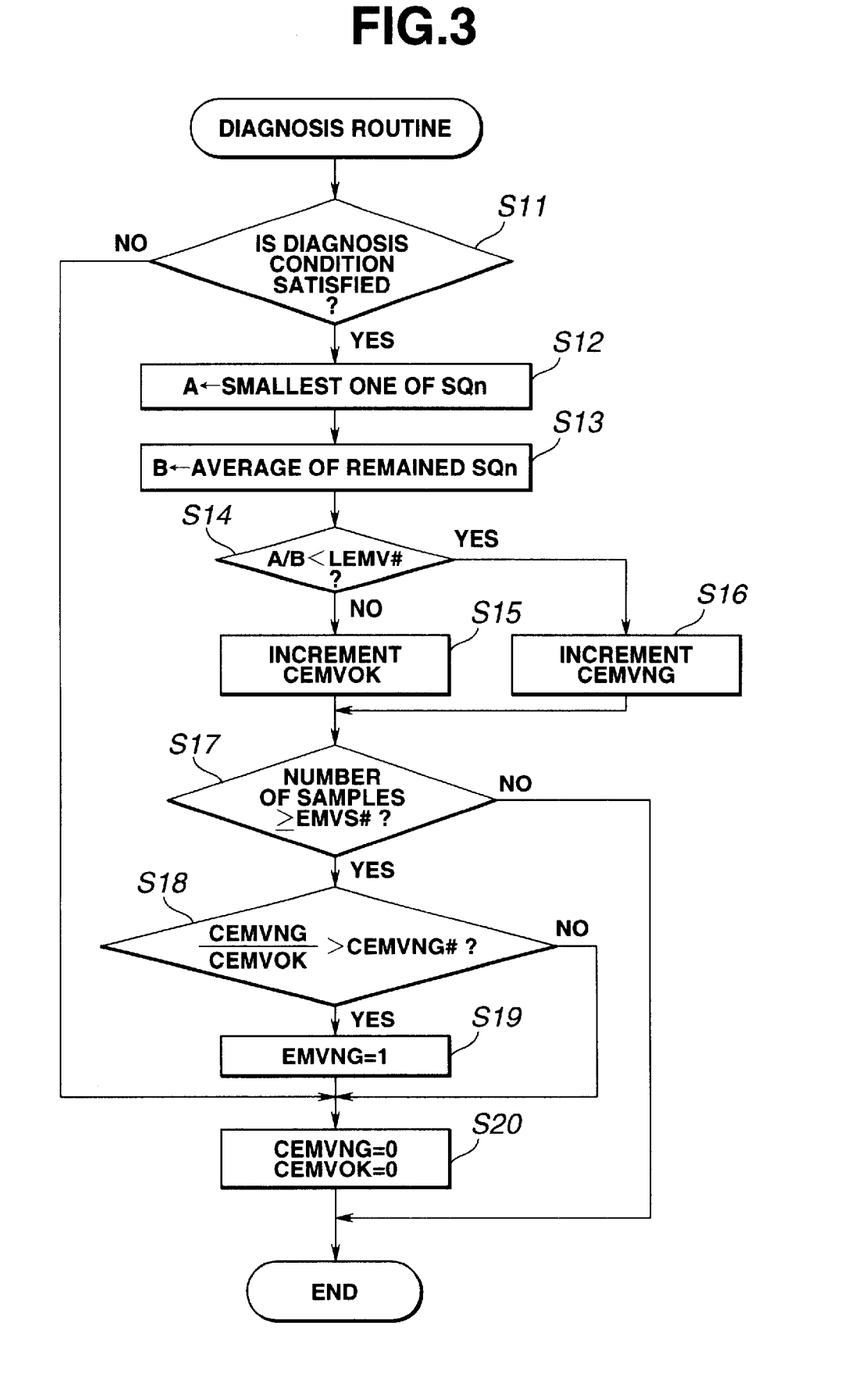
FIG. 3 is a flowchart for diagnosing the variable valve operating systems of the first embodiment.
Figure 4:
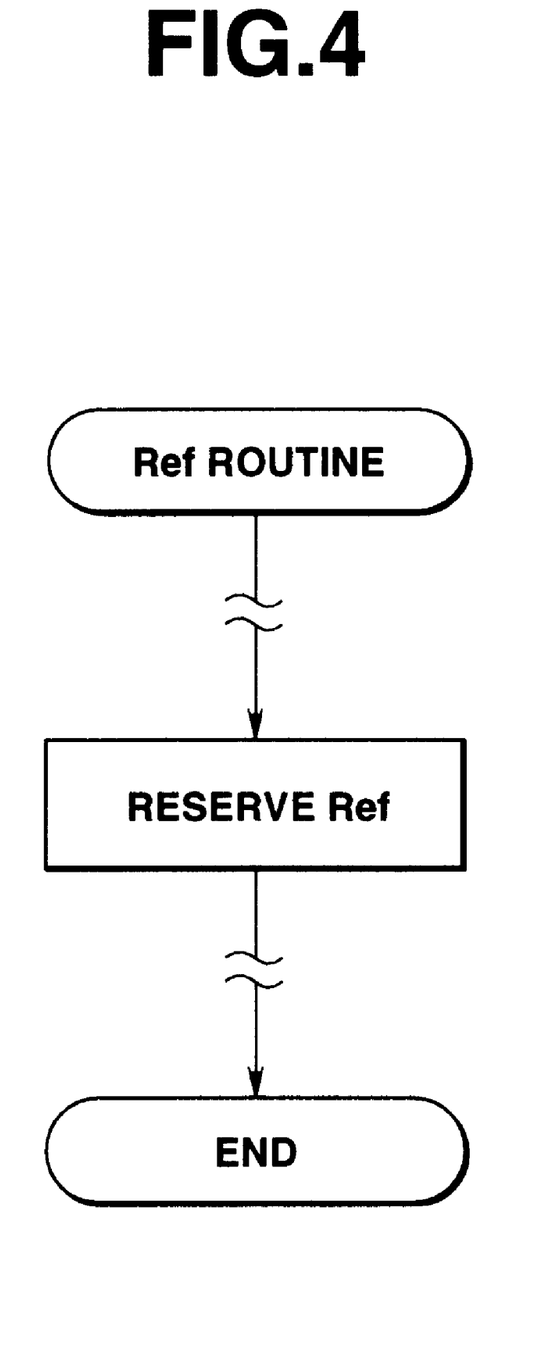
FIG. 4 is a flowchart for a Ref signal reservation.

On the basis of the accumulated value SQn for each cylinder #n which value was obtained by the implementation of the flowchart of FIG. 2, the diagnosis process for the variable valve operating system 13 and 15 is executed as shown by a flowchart of FIG. 3.

At a step S11, the control unit 7 decides whether the diagnosis condition is satisfied or not. More specifically, the control unit 7 checks whether the engine operating condition is put in a stationary condition on the basis of a rate ΔTVO of change of the throttle opening degree TVO and/or a rate ΔNe of the change of the engine rotation speed Ne, and/or whether the airflow meter 9 is normally operated. When the decision at the step S11 is affirmative, the routine proceeds to a step S12. When the decision at the step S11 is negative, the routine proceeds to a step S20.

At the step S12, the control unit 7 sets A at the smallest value of the accumulated values SQn.

At a step S13, the control unit 7 set B at an average value of the remained values SQn except for the smallest value A.

At a step S14, the control unit 7 decides whether A/B is smaller than or equal to a first diagnosis reference value LEMV# or not. Instead of A/B, a difference B−|A| may be employed. When the decision at the step S14 is affirmative, indicating at least one of the variable valve operating systems 13 and 15 tends to be put in a malfunction state, the routine proceeds to a step S16 wherein the control unit 7 increments an abnormal counter CEMVNG by 1 (CEMVNG←CEMVNG+1). When the decision at the step S14 is negative, indicating both of the variable valve operating systems 13 and 15 are operating normally, the routine proceeds to a step S15 wherein the control unit 7 increments a normal counter CEMVOK by 1 (CEMVOK←CEMVOK+1).

At a step S17, the control unit 7 decides whether the executed number of the diagnosis routines (sampling times) is greater than or equal to a predetermined value EMVS# or not. When the decision at the step S17 is affirmative, the routine proceeds to a step S18. When the decision at the step S17 is negative, the present routine terminated, and the flowchart of FIG. 2 and the steps S11 to S16 of the flowchart of FIG. 3 are repeated until the decision at the step S17 becomes affirmative.

At the step S18 following the affirmative decision at the step S17, the control unit 7 decides whether CEMVNG/CEMVOK is greater than a predetermined value CEMVNG# or not. When the decision at the step S18 is affirmative (CEMVNG/CEMVOK>CEMVNG#), indicating that the ratio of the abnormality decisions in the predetermined times of samplings is high, the control unit 7 decides that the result of the abnormality decision is correct and diagnoses that at least one of the variable valve operating systems 13 and 15 are put in the malfunction state. Therefore, as a result of the affirmative decision at the step S18, the routine proceeds to a step S19 wherein the control unit 7 sets an abnormality flag EMVNG at 1 (EMVNG=1) and turns on an alarm lamp MIL to inform a driver that at least one of the variable valve operating systems 13 and 15 are put in the malfunction state.

On the other hand, when the decision at the step S18 is negative, indicating that the ratio of the abnormality decisions in the predetermined times of samplings is low or zero, the control unit 7 diagnoses that the variable valve operating systems 13 and 15 are put in a normal state. Therefore, as a result of the negative decision at the step S18, the routine proceeds to a step S20 wherein the control unit 7 resets an abnormality counter CEMVNG and a normal counter CEMVOK at 0 (CEMVNG=0 and CEMVOK=0). Then, this routine is terminated.

With the thus arranged first embodiment according to the present invention, it becomes possible to accurately diagnose the malfunction state (abnormality) of the intake valves 12 and the exhaust valves 14 and further the variable valve operating system 13 and 15 by employing the detection result of the airflow meter 9 without further employing sensors for diagnosing of the intake valves 12 and the exhaust valves 14 and further the variable valve operating systems 13 and 15.

Hereinafter, a principle of the abnormality diagnosis of the variable valve operating systems 13 and 15 in accordance with the present invention will be discussed.

(1) A case that the intake valve 12 is locked in a closing state:

When the intake valve 12 of the second cylinder #2 is locked in a closing state as shown in FIGS. 8A to 8E, the intake air flow rate Qa to be increased in a normal state during a charging process of the second cylinder is kept generally zero. Therefore, the accumulated value $SQ_2$ during the particular period corresponding to the second cylinder #2 becomes generally zero.

On the other hand, the accumulated values $SQ_1$, $SQ_3$ and $SQ_4$ during the respective particular periods corresponding to the first, third and fourth cylinders #1, #3 and #4 put in the normal state are increased to a normal value according to the increase of the intake air flow rate according to the normal operation of the intake valves 12 of the respective first, third and fourth cylinders #1, #3 and #4.

Accordingly, when the intake valve 12 of the second cylinder #2 is locked in a closing state, the control unit 7 sets A at $SQ_2$ ($\approx 0$) by the execution of the step S12 and sets B at an average value of the respective accumulated values $SQ_1$, $SQ_3$ and $SQ_4$ by the execution of the step S13. Therefore, the value A/B becomes generally zero, and the control unit 7 decides that A/B is smaller than or equal to LEMV# (A/B≦LEMV#). On the basis of this decision, the control unit 7 diagnoses that at least one of the intake valves 12 of the respective cylinders is put in the malfunction state (herein, the intake valve is locking in a closing state).

(2) A case that the intake valve 12 is locked at an opening state:

When the intake valve 12 of the second cylinder #2 is locked in an opening state as shown in FIGS. 9A to 9E, the airflow meter 9 and the second cylinder #2 are always communicated with each other. That is, since the airflow meter 9 detects the air fluctuation due to the piston motion (cylinder volume change) of the second cylinder #2, the detection value Qs of the airflow meter 9 is fluctuated according to the piston motion of the second cylinder #2. Therefore, the particular period accumulated value SQn takes a positive value at some cylinders such as the second and fourth cylinders #2 and #4 and takes a negative value at some cylinders such as the first and third cylinders #1 and #3.

Although at the cylinder, whose intake valve 12 is locked in an opening state, the accumulated value SQn (herein $SQ_2$) takes a positive value, the accumulated value SQn (herein $SQ_2$) does not include an increased amount of the intake air flow rate which is included at that of the normal intake valve 12. Therefore, the accumulated valve SQn of the cylinder having open-locked intake valve 12 takes the smallest value in the positive values of SQn of the respective cylinders #1, #2, #3 and #4. That is, it is diagnosed that the cylinder, whose accumulated value SQn is the smallest one of the positive values, is the cylinder whose intake valve 12 is locked in the opening state.

When the inlet value 12 of the second cylinder #2 is locked in the opening state, the accumulated value $SQ_1$ of the first cylinder #1 which is a previous period of the particular period of the second cylinder #2, takes a negative value due to the reverse flow of the intake air caused by the raising motion of the piston of the second cylinder #2. Since the particular period of the first cylinder #1 is overlapped with the opening period of the exhaust value 14 of the first cylinder #1, the accumulated value $SQ_1$ of the first cylinder #1 takes a further small value as compared with the accumulated value $SQ_3$ which is not affected by the reverse flow although the accumulated values SQn takes negative values.

Accordingly, when the intake valve 12 of the second cylinder #2 is locked in the opening state, A is set at the accumulated value $SQ_1$ (negative large magnitude value) at the step S12, and B is set at the average value of the accumulated values $SQ_2$, $SQ_3$ and $SQ_4$ at the step S13. As shown in FIGS. 9A to 9E, since the negative value of the accumulated value $SQ_3$ is cancelled by the increment of the intake air flow rate due to the opening operation of the intake valve 12 of the third cylinder #3, $SQ_4-|SQ_3|>0$. Therefore, the accumulated values $SQ_2$, $SQ_3$ and $SQ_4$ take positive values.

As a result, A/B takes a negative value, and the control unit 7 decides at the step S14 that A/B is smaller than or equal to the first diagnosis reference value LEMV# (A/B≦LEMV#). Therefore, by the execution of the flowchart of FIG. 3, it is possible to diagnose that at least one of the intake valves 12 is put in the malfunction state. Upon specifying the kind of the malfunctions and the cylinders, it is possible to diagnose that the cylinder, whose accumulated value SQn takes the smallest value in the positive values, is generating a malfunction that the intake valve 12 is locked at the opening state, or that a cylinder operated in process following the cylinder, whose accumulated value SQn takes the smallest value, is generating a malfunction that the intake valve 12 is locked in the opening state.

When the control unit 7 decides that the intake valve 12 of a cylinder is locked in the opening state, the control unit 7 controls that the exhaust valve 14 of the cylinder generating a malfunction at the intake valve 12 is always closed for fail-safe so as to prevent the reverse-flow of the exhaust gas toward the intake side of the engine 1.

(3) A case that the exhaust valve 14 is locked in the closing state:

As shown in FIGS. 10A to 10E, when the exhaust valve 14 of the second cylinder #2 is locked in the closing state, at the beginning of the particular (accumulated) period corresponding to the second cylinder #2, the combustion gases of the second cylinder #2, which has not been discharged due to the closing malfunction of the exhaust valve 14, flows back toward the intake side at the timing that the intake valve 12 is opened. Therefore, the detection value Qs of the airflow meter 9 takes a large negative value and then is normally increased due to the air intake operation of the opening operation of the intake valve 12 of the second cylinder #2.

Accordingly, the accumulated value $SQ_2$ during the particular period corresponding to the second cylinder #2 takes a generally zero since the negative value at the beginning of the particular period is cancelled by the positive value normally increased thereafter. Therefore, when the exhaust valve 14 of the second cylinder #2 is locked in the closing state, the control unit 7 sets A at the accumulated value $SQ_2$ (≈0) at the step S12 and sets B at the average value of the accumulated values $SQ_1$, $SQ_3$ and $SQ_4$. Since A/B takes a negative zero (A/B≈0), the control unit 7 decides at the step S14 that A/B is smaller than or equal to the first diagnosis reference value LEMV# (A/B≦LEMV#). Therefore, by the execution of the flowchart of FIG. 3, it is diagnosed that the exhaust valve 14 of one cylinder (herein second cylinder #2) is put in the malfunction state (close-locking state).

By monitoring the variation of the detection value Qs of the airflow meter 9 or of the accumulated value SQn during the particular period corresponding to the abnormal cylinder, more specifically by comparing the timing charts of FIGS. 8A to 8E and the timing charts of FIGS. 10A to 10E, it is possible to diagnose the malfunction state while differentiating whether the intake valve 12 is locked in the closing state or the exhaust valve 14 is locked in the closing state.

(4) A case that the exhaust valve 14 is locked in the opening state:

As shown in FIGS. 11A to 11E, when the exhaust valve 14 of the second cylinder #2 is locked in the opening state, that is, when the second cylinder #2 is always communicated with the exhaust passage, the exhaust gases in the exhaust passage flows back toward the second cylinder #2 and the intake side during the intake valve opening period. Therefore, the airflow meter 9 detects the reverse flow as the negative value.

Accordingly, the accumulated value SQ2 of the second cylinder takes a negative value or an extremely small positive value. Therefore, when the exhaust valve 14 of the second cylinder #2 is locked in the opening state, A is set at the accumulated value $SQ_2$ (=negative value or extremely small positive value) by the execution of the step S12, and B is set at the average value of the respective accumulated values $SQ_1$, $SQ_3$ and $SQ_4$ of the normal cylinders #1, #3 and #4.

Therefore, the control unit 7 decides at the step S14 that A/B≦LEMV# (diagnosis reference value). Therefore, it is diagnoses that at least one of the exhaust valves 14 is put in the malfunction state (herein, the exhaust valve 14 of the second cylinder is locked in the opening state).

By monitoring the variation of the detection value Qs of the airflow meter 9 or of the accumulated value SQn during the particular period corresponding to the abnormal cylinder, more specifically by comparing the timing charts of FIGS. 9A to 9E and the timing charts of FIGS. 11A to 11E, it is possible to diagnose the malfunction state while differentiating whether the intake valve 12 is locked in the opening state or the exhaust valve 14 is locked in the opening state.

That is, the diagnosis control according to the present invention is arranged to diagnose that at least one of the intake valve 12 and the exhaust valve 14 is put in the abnormal state by employing the characteristics that the accumulated value SQn during the particular period corresponding to a cylinder becomes very smaller than the average of other accumulated values SQn when at least one of the intake valve 12 or exhaust valve 14 is locked in the opening state or closing state. Therefore, the diagnosis system according to the present invention achieves the accurate diagnosis of the variable valve operating systems 13 and 15 while keeping simple and inexpensive construction without adding special sensors for this diagnosis.

Although the first embodiment according to the present invention has been shown and described as to a case that the diagnosis is executed on the basis of the accumulated value SQn during the particular period, it will be understood that such a diagnosis may be executed on the basis that a difference or ratio among average values of the intake air flow rate Qs during the particular period of the corresponding cylinder is greater than a predetermined level if the variable valve operating system 13, 15 is put in the abnormal state.

Figure 5:
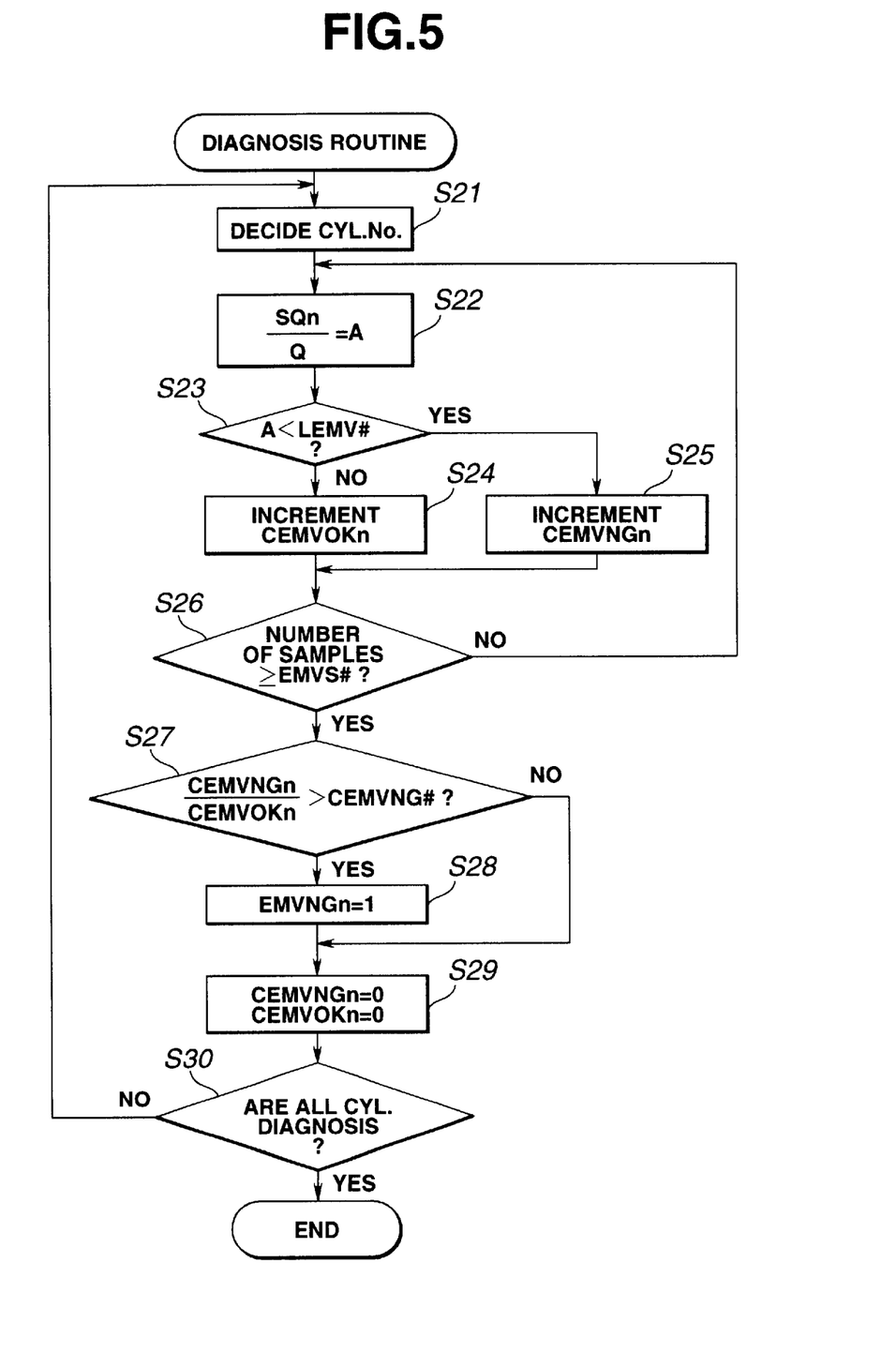
FIG. 5 is a flowchart for diagnosing the variable valve operating system of each cylinder of a second embodiment.

Referring to FIG. 5, a second embodiment of the diagnosis system according to the present invention will be discussed. The system construction of the second embodiment is the same as that of the first embodiment shown in FIG. 1. Only the flowchart of FIG. 5 is different from that of FIG. 3 of the first embodiment. Therefore, only the flowchart of FIG. 5 will be explained herein. The main routine of the flowchart of FIG. 5 is executed by each reading of SQn, such as by each 180° crankangle.

At a step S21, the control unit 7 decides the cylinder #n (No.) on the basis of the reference signal Ref.

At a step S22, the control unit 7 reads the accumulated value SQn of the cylinder obtained in the flowchart of FIG. 3, and obtains a ratio A=SQn/Q. Q is a target value of the intake air flow rate which is set for obtaining a desired torque from the acceleration opening degree (or TVO) and the engine rotation speed Ne. That is, the valve operation characteristic of the intake valve 12 or exhaust valve 14 by which the target value Q is achieved, is set. More specifically, the control unit 7 determines the control quantity (operation command signal) of the variable valve operating systems 13 and 15 and/or the valve operation characteristics, such as at least one of opening-and-closing timing (phase angle), lift amount and operation angle, of the intake valve 12 and the exhaust valve 14 so as to achieve the target value Q. If the operation of the variable valve operating system 13, 15 is normal, the preset target value Q (volumetric intake air flow rate/cylinder) is in proportion with the accumulated value SQn (mass flow rate/cylinder).

At a step S23, the control unit 7 decides whether A is smaller than the diagnosis reference value LEMV# or not. When the decision at the step S23 is affirmative (A<LEMV#), indicating the accumulated value SQn takes a small value to keep a predetermined level with respect to the target value Q, the control unit 7 decides that at least one of the intake valve 12 and the exhaust valve 14 of the corresponding cylinder may be put in the abnormal state. Therefore, the routine proceeds to a step S25 wherein the control unit 7 increments the abnormal counter CEMVNGn of the corresponding cylinder (CEMVNGn←CEMVNGn+1). When the decision at the step S23 is negative (A≧LEMV#), indicating that the operation of the intake valve 12 and the exhaust valve 14 of the corresponding cylinder are normal, the routine proceeds to a step S24 wherein the control unit 7 increments the normal counter CEMVOKn of the corresponding cylinder (CEMVOKn←CEMVOKn+1).

Following the execution at the step S24 or S25, the routine proceeds to a step S26 wherein the control unit 7 decides whether the number of samples becomes greater than or equal to a predetermined value EMVS# or not. When the decision at the step S26 is affirmative, the routine proceeds to a step S27. When the decision at the step S26 is negative, the routine returns to the step S22 and repeats the steps S22 to S26 until the decision at the step S26 becomes the affirmative decision.

At the step S27 following to the affirmative decision at the step S26, the control unit 7 decides whether CEMVNG/CEMVOK is greater than a predetermined value CEMVNG# or not. When the decision at the step S27 is affirmative (CEMVNG/CEMVOK>CEMVNG#), indicating that the ratio of the abnormality decisions in the predetermined times of samplings is high, the control unit 7 decides that the result of the decision is correct and diagnoses that at least one of the variable valve operating systems 13 and 15 are put in the malfunction state. Therefore, as a result of the affirmative decision at the step S27, the routine proceeds to a step S28 wherein the control unit 7 sets an abnormality flag EMVNG at 1 (EMVNGn=1) and turns on an alarm lamp MIL to inform a driver that at least one of the variable valve operating systems 13 and 15 are put in the malfunction state.

On the other hand, when the decision at the step S27 is negative (CEMVNG/CEMVOKs≦CEMVNG#), indicating that the ratio of the abnormality decisions in the predetermined times of samplings is low or zero, the control unit 7 diagnoses that the variable valve operating system 13 or 15 of the corresponding cylinder #n is put in the normal state. Therefore, as a result of the negative decision at the step S27, the routine proceeds to a step S29 wherein the control unit 7 resets the abnormality counter CEMVNGn and the normal counter CEMVOKn at 0 (CEMVNGn=0 and CEMVOKn=0).

At a step S30, the control unit 7 decides whether the diagnosis of all cylinders has been terminated or not. When the decision at the step S30 is negative, the routine returns to the step S21. When the decision at the step S30 is affirmative, the routine is terminated.

With the thus arranged second embodiment, the system according to the present invention executes the accurate diagnosis of the intake and exhaust valves 12 and 14 including the variable valve operating systems 13 and 15 from the detection result of the airflow meter 9 while keeping simple and inexpensive construction without adding special sensors for this diagnosis. Furthermore, since the diagnosis system according to the present invention is arranged so that the diagnosis is executed on the basis of the target value Q set according to the vehicle driving condition and the accumulated value SQn of the corresponding cylinder, the diagnosis system can diagnose the abnormality of the intake valve 12 or the exhaust valve 14 even if the engine operating condition is put in a transient state. That is, with the thus arranged diagnosis system according to the present invention, the diagnosis for specifying the abnormal cylinder and diagnosing the operational abnormality of the intake valve 12 or the exhaust valve 14. As mentioned in the above, an essential feature of the present invention is to specify the abnormal cylinder and the kind of the malfunction thereof such as the inlet or exhaust valve 12, 14 and opening lock or closing lock malfunction while maintaining a simple and inexpensive construction of the diagnosis system.

Figure 6:
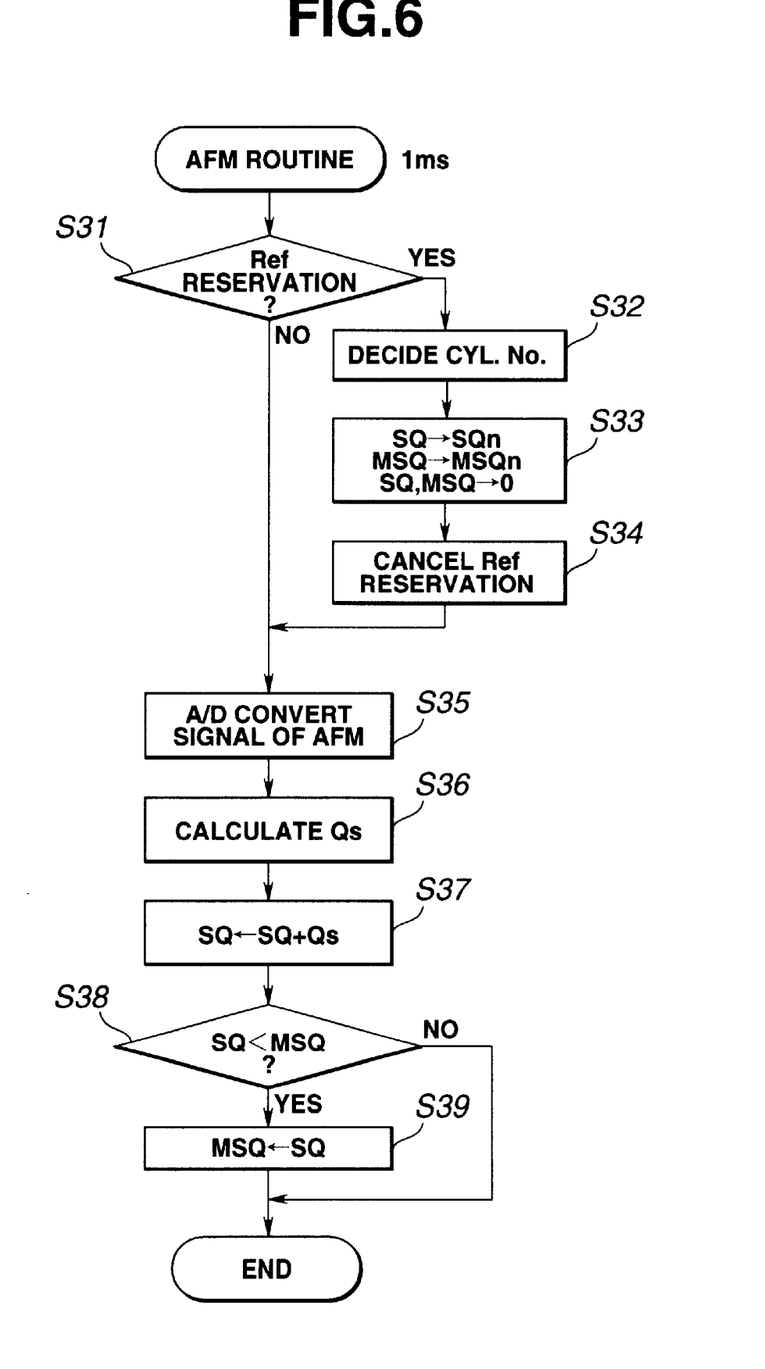
FIG. 6 is a flowchart for calculating the accumulated values SQn and a minimum value MSQn thereof of the particular period of a third embodiment.
Figure 7:
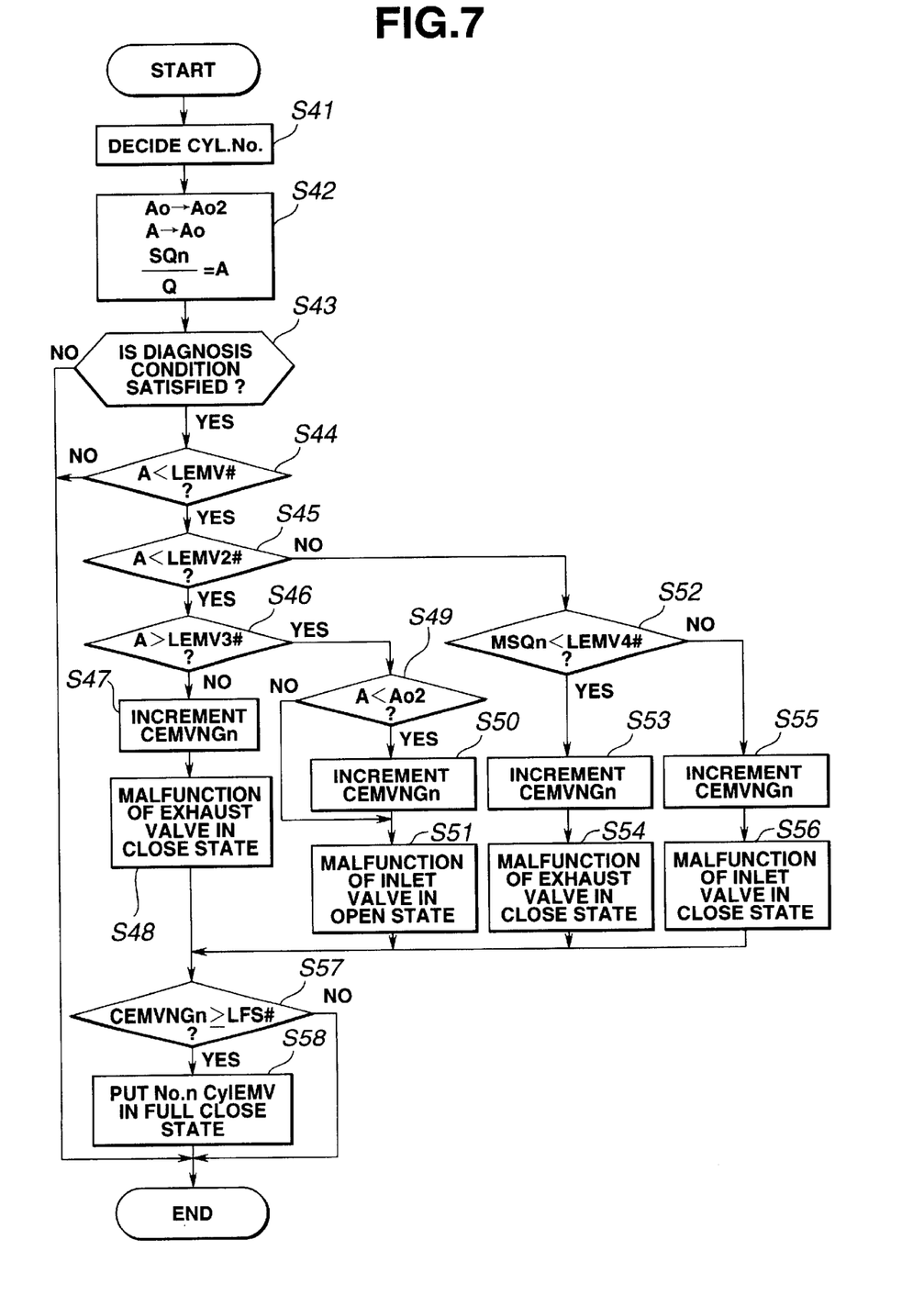
FIG. 7 is a flowchart for diagnosing the variable valve operating system of each cylinder of a third embodiment.
Figure 8A:
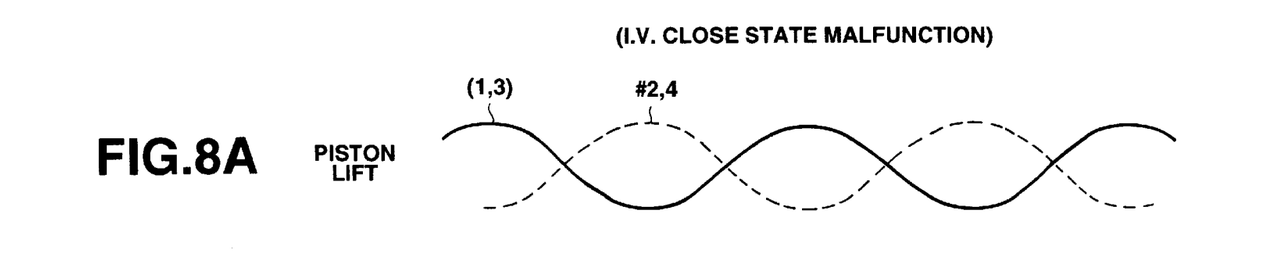
FIGS. 8A to 8E are timing charts showing changes of an intake airflow rate Qs and the accumulated value thereof with respect to an crankangle in case of a closing-lock malfunction of an intake valve.
Figure 8B:
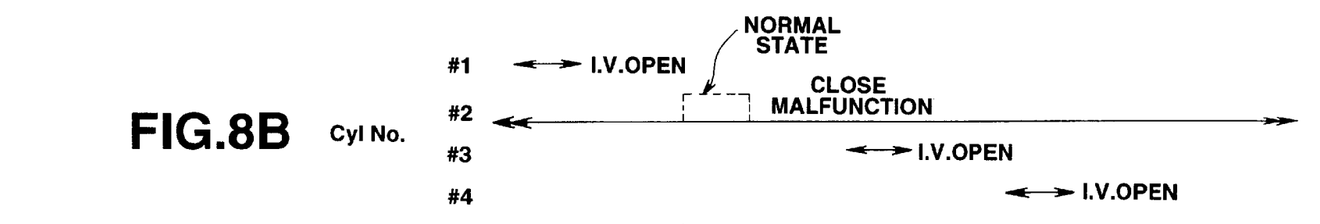
Figures 8C, 8D:
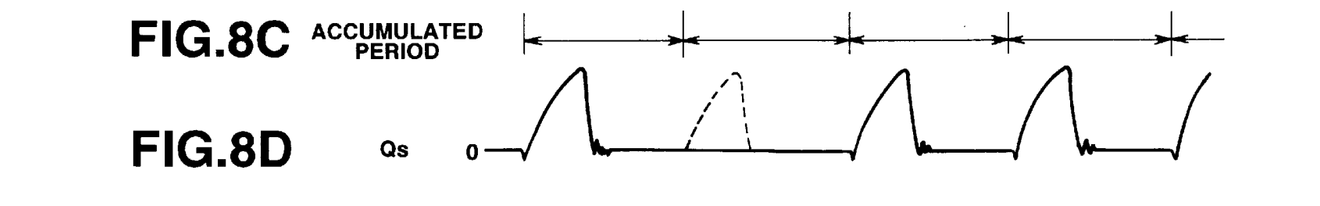
Figure 8E:
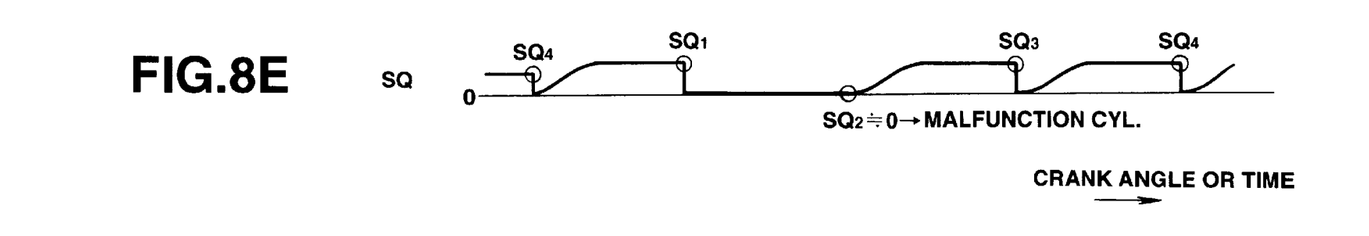
Figure 9A:
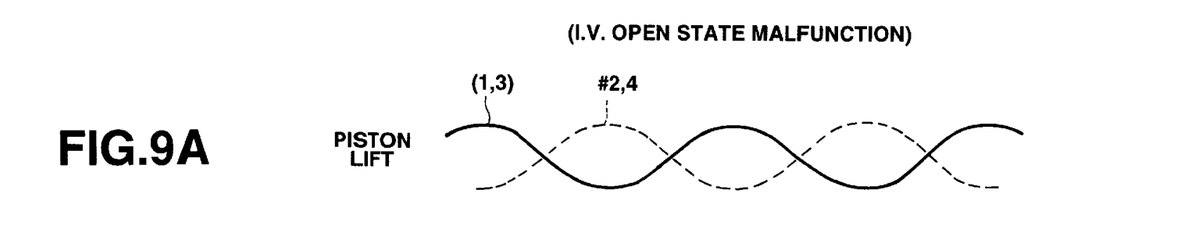
FIGS. 9A to 9E are timing charts showing changes of an intake airflow rate Qs and the accumulated value thereof with respect to an crankangle in case of an opening-lock malfunction of the intake valve.
Figure 9B:
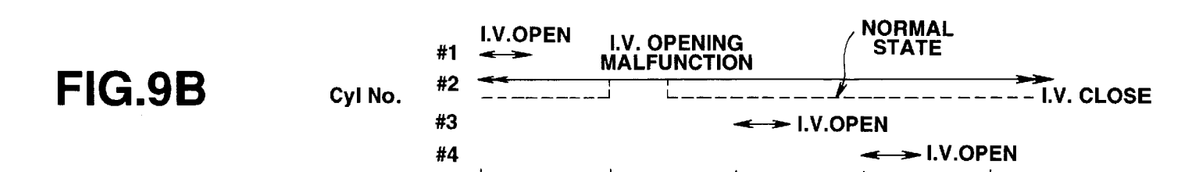
Figure 9C:
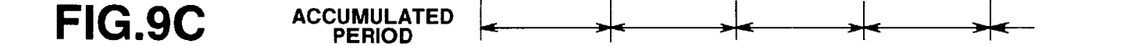
Figures 9D, 9E:
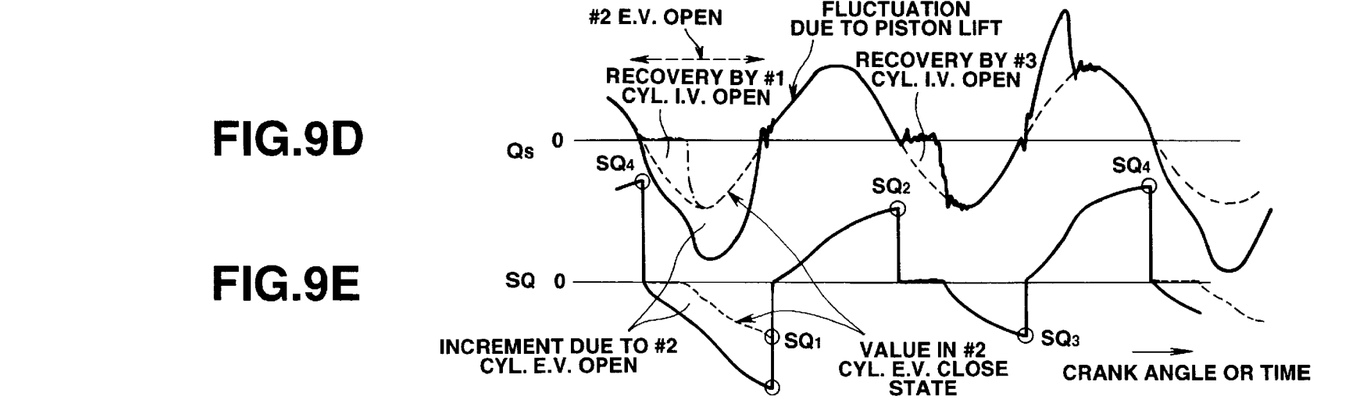
Figure 10A:
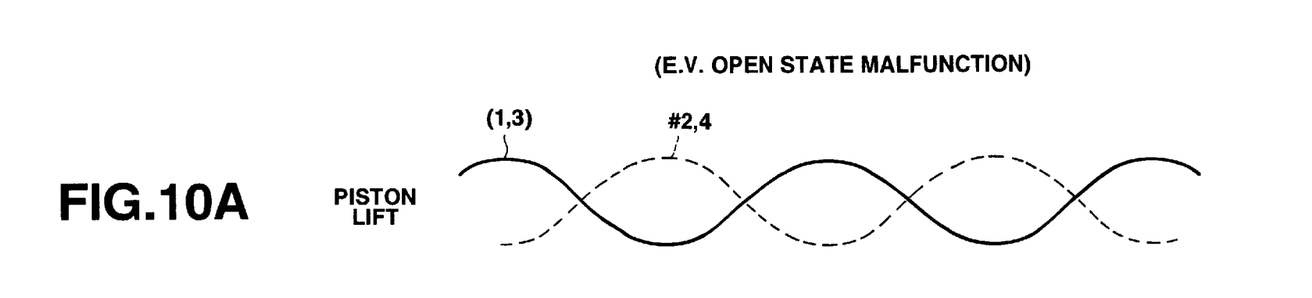
FIGS. 10A to 10E are timing charts showing changes of an intake airflow rate Qs and the accumulated value thereof with respect to an crankangle in case of the closing-lock malfunction of an exhaust valve.
Figure 10B:
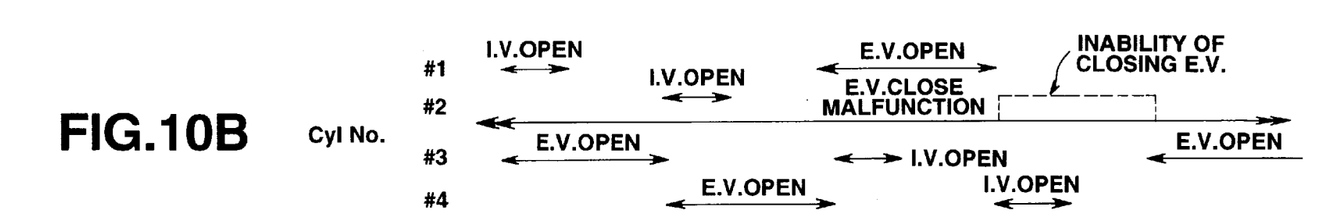
Figure 10C:
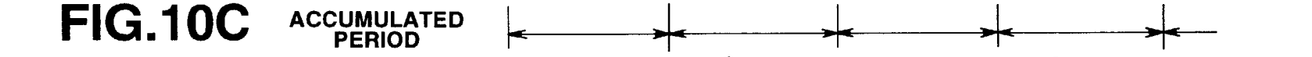
Figures 10D, 10E:
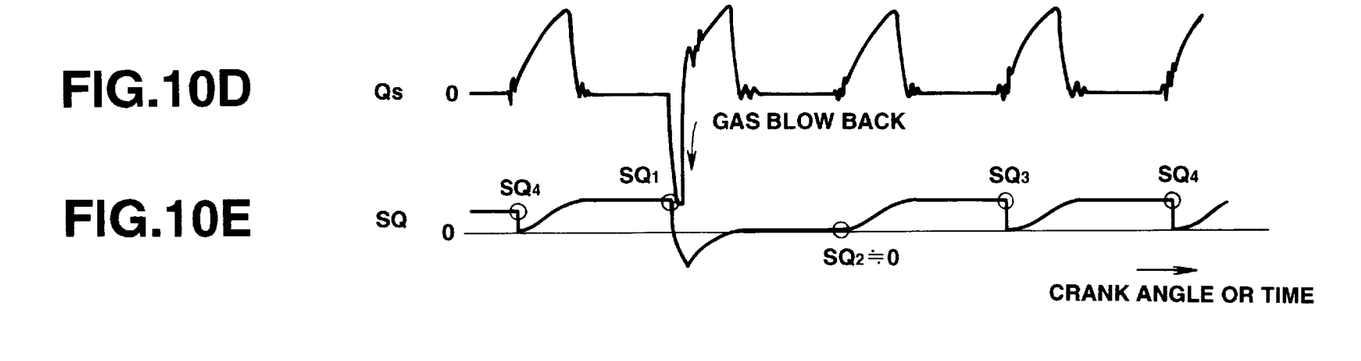
Figure 11A:
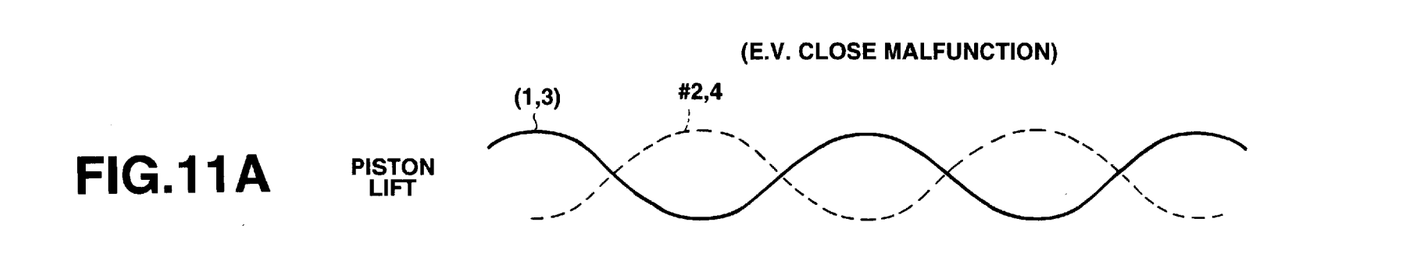
FIGS. 11A to 11E are timing charts showing changes of an intake airflow rate Qs and the accumulated value thereof with respect to an crankangle in case of the opening-lock malfunction of an intake valve.
Figures 11B, 11C:
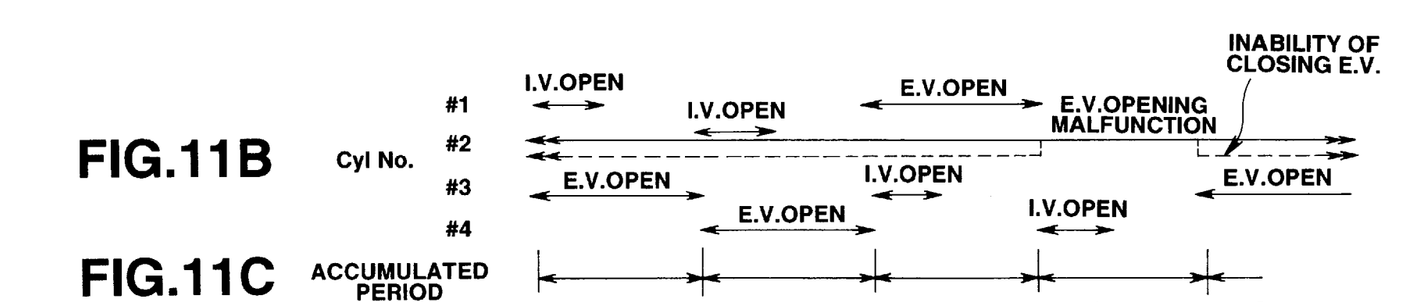
Figure 11D:
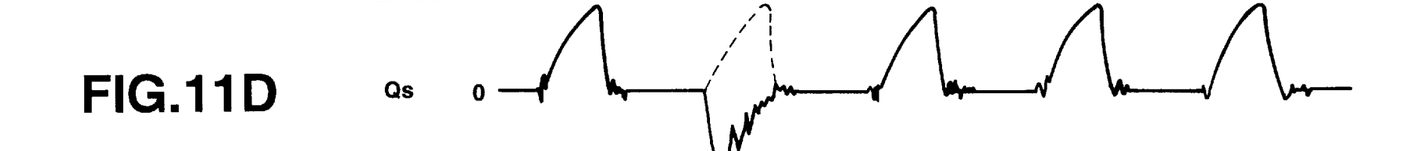
Figure 11E:
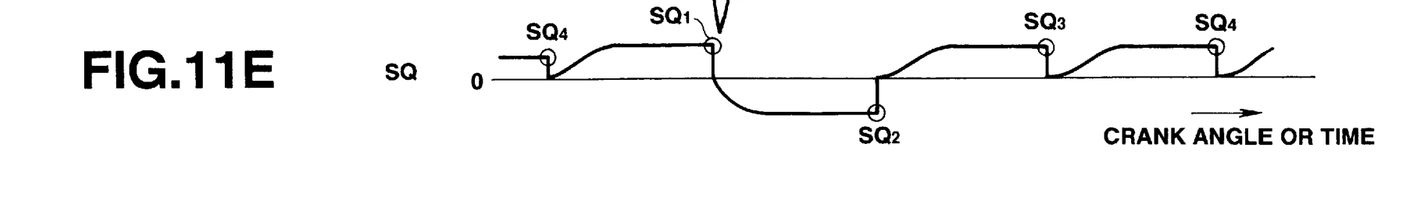

Referring to FIGS. 6 and 7, a third embodiment of the diagnosis system according to the present invention will be discussed. The system construction of the third embodiment is the same as that of the first embodiment shown in FIG. 1. The flowcharts of FIGS. 6 and 7 of the third embodiment are different from those of FIGS. 2 and 3 of the first embodiment. Therefore, the flowcharts of FIGS. 6 and 7 will be explained hereinafter.

The routine of the flowchart of FIG. 6 is implemented to obtain an accumulated value SQn during a particular period corresponding to each cylinder and a minimum value MSQn of the accumulated values SQn.

At a step S31, the control unit 7 decides whether the reference signal Ref is reserved or not. This reservation of the reference signal Ref is achieved by executing a routine of a flowchart shown in FIG. 4 when the control unit 7 receives the reference signal Ref from the crankangle sensor 8. When the decision at the step S31 is affirmative, the routine proceeds to a step S32. When the decision at the step S31 is negative, the routine jumps to a step S35.

At a step S32, the control unit 7 decides the cylinder #n of the engine 1 according to the reference signal Ref. More specifically, in this embodiment a width of an ON signal of the reference signal Ref is differentiated so that the control unit 7 can distinguishes a number of the cylinder.

At a step S33, the control unit 7 sets the accumulated value SQ which is an accumulated value of the detection value Qs of the airflow meter 9 during a perticular period, as SQn (SQ→SQn). Further, the control unit 7 sets the minimum value MSQ of the obtained detection values SQn as MSQn (MSQ→MSQn) and resets the accumulated value SQ and the minimum value MSQ at 0 (SQ←0, MSQ←0).

At a step S34, the control unit 7 cancels the reservation of the reference signal Ref.

At a step S35, the control unit 7 A/D converts an analog voltage signal into a digital value.

At a step S36, the control unit 7 calculates the detected intake air flow rate Qs by means of a linearization treatment using the digital value obtained at the step S35 and a table previously stored in the control unit 7.

At a step S37, the control unit 7 accumulates the value Qs processed at the step S36 for a special period (during Ref signal). More specifically, the accumulated value SQ is obtained from the following equation (1):

Accumulated Value $SQ$=Holding Value $SQ$ (previous value)+$Qs$ (1)

At a step S38, the control unit 7 decides whether the accumulated value SQ is smaller than the minimum value MSQ or not. MSQ is the minimum value of the accumulated value and has been initially set at 0. When the decision at the step S38 is affirmative (SQ<MSQ), indicating that the accumulated value SQ is decreasing toward the negative minimum value, the routine proceeds to a step S39 wherein the control unit 7 updates the minimum value by replacing the minimum value MSQ with a present accumulated value SQ. Thereafter, the routine returns to a start step. When the decision at the step S38 is negative (SQ≧MSQ), indicating that the accumulated value SQ takes a positive value or loses the decreasing tendency toward the minimum value, the control unit 7 decides that the minimum value MSQ is obtained. Therefore, the routine returns to the start step without updating the minimum value.

After the control unit 7 obtained the accumulated value SQn of the particular period corresponding to the cylinder and the minimum value MSQn of the accumulated value SQn, the routine shown by a flowchart of FIG. 7 is executed to diagnose the variable valve operating systems 13 and 15 on the basis of the accumulated values SQn and the minimum value MSQn. This main routine is executed by each SQn reading, for example at every 180° crankangle.

At a step S41, the control unit 7 decides which one of the cylinders of the engine 1 is diagnosed, according to the reference signal Ref. More specifically, in this embodiment a width of an ON signal of the reference signal Ref is differentiated so that the control unit 7 can distinguishes a number of the cylinder.

At a step S42, the control unit 7 reads the accumulated value SQn obtained by the execution of the flowchart of FIG. 6, and obtains a ratio A=SQn/Q. Q is a target value of the intake air flow rate which is set for obtaining a desired torque from the acceleration opening degree (or TVO) and the engine rotation speed Ne.

At a step S43, the control unit 7 decides whether the diagnosis condition is satisfied or not, as is the same as the step S11 of FIG. 2. When the decision at the step S43 is affirmative, the routine proceeds to a step 44. When the decision at the step S43 is negative, the routine is terminated.

At the step S44, the control unit 7 decides whether A is smaller than the first diagnosis reference value LEMV# or not. When the decision at the step S44 is affirmative (A<LEMV#), indicating the accumulated value SQn takes a small value to keep a predetermined level with respect to the target value Q, the control unit 7 decides that at least one of the intake valve 12 and the exhaust valve 14 of the corresponding cylinder may be put in abnormal state. Therefore, the routine proceeds to a step S45. When the decision at the step S44 is negative (A≧LEMV#), indicating that the intake valve 12 and the exhaust valve 14 of the corresponding cylinder are normal, the routine is terminated.

At the step S45, the control unit 7 decides whether or not A is smaller than a second diagnosis reference value LEMV2# set at a predetermined negative value. When the decision at the step S45 is affirmative (A<LEMV2#), indicating that the accumulated value SQn takes a negative value, the control unit 7 decides that at least one of the intake valve 12 and the exhaust valve 14 of the corresponding cylinder may be locked in an opening state as shown in the timing charts of FIGS. 9A to 9E and 11A to 11E. Therefore, the routine proceeds to a step S46. When the decision at the step S45 is negative (A≧LEMV2#), indicating that A and SQn take generally zero (A≈0, SQn≈0), the control unit 7 decides that at least one of the intake valve 12 and the exhaust valve 14 of the corresponding cylinder may be locked in a closing state as shown in the timing charts of FIGS. 8A to 8E and 10A to 10E. Therefore, the routine proceeds to a step S53.

At the step S46, the control unit 7 decides whether $A_0$ of the previous cylinder (the first cylinder with respect to the second cylinder #2) is greater than a third diagnosis reference value LEMV3# or not. The value $A_0$ is obtained by dividing the accumulated value SQn of the previous cylinder by the target value Q ($A_0$=SQ1/Q). When the decision at the step S46 is negative ($A_0$≦LEMV3#), indicating that the malfunction indicated by the timing charts of FIGS. 11A to 11E is generated, the control unit 7 decides that the exhaust valve 14 of the corresponding cylinder (the second cylinder #2) may be locked in the opening state. Therefore, the routine proceeds to a step S47.

At the step S47, the control unit 7 increments the abnormal counter CEMVMGn of the corresponding cylinder #n.

At a step S48 following to the execution of the step S47, the control unit 7 diagnoses that the exhaust valve 14 of the corresponding cylinder #n is locked in the opening state. Then, the routine proceeds to a step S57.

When the decision at the step S46 is affirmative ($A_0$>LEMV3#), indicating that the malfunction shown by the timing charts of FIGS. 9A to 9E is generated, the control unit 7 decides that the intake valve 12 of the corresponding cylinder (the second cylinder #2) may be locked in the opening state. Therefore, the routine proceeds to a step S49.

At the step S49, the control unit 7 decides whether A of the corresponding cylinder (the first cylinder #1 if the intake valve 12 of the second cylinder #2 is locked in the opening state) is smaller than $A_{02}$ of the two prior cylinder (the third cylinder #3) or not. When the decision at the step S49 is affirmative, the routine proceeds to a step S50 wherein the control unit 7 increments the abnormal counter $CEMVNGn_{+1}$ of the corresponding cylinder (second cylinder) by 1 ($CEMVNGn_{+1} \leftarrow CEMVNGn_{+1}+1$). Thereafter, the routine proceeds to a step S51 wherein the control unit 7 diagnoses that the intake valve 12 of the corresponding cylinder is locked in the opening state. Then, the routine proceeds to the step S57. When the decision at the step S49 is negative, the routine jumps to the step S51 without incrementing the abnormal counter $CEMVNGn_{+1}$.

When the routine proceeds to the step S49 following to the affirmative decision at the step S46, the control unit 7 decides that the malfunction mode corresponds to the mode that the intake valve 12 is locked in the opening state as shown in FIGS. 9A to 9E. More specifically, when the inlet value 12 of the second cylinder #2 is locked in the opening state, a situation that the accumulated value SQn takes a negative value and therefore the affirmative decision is outputted at the step S46 is generated in the first cylinder #1 and the third cylinder #3. Therefore, it is necessary to differentiate whether the malfunction at the second cylinder #2 following to the first cylinder #1 or the fourth cylinder #4 following to the third cylinder #3.

Therefore, the step S49 is provided to execute this differentiation. That is, at the step S49, by diagnosing A<$A_{02}$, the control unit 7 differentiates whether the malfunction at the second cylinder #2 following to the first cylinder #1 or the fourth cylinder #4 following to the third cylinder #3.

When the decision at the step S45 is negative (A≧LEMV2#), indicating that A and SQn take generally zero (A≈0, SQn≈0), the control unit 7 decides that at least one of the intake valve 12 and the exhaust valve 145 may be locked in the closing state, as shown in FIGS. 8A to 8E and 10A to 10E. Accordingly, the routine proceeds to the step S52. At the step S52, the control unit 7 decides whether the minimum value MSQn is smaller than a fourth diagnosis reference value LEMV4# or not. When the decision at the step S52 is affirmative (NSQn<LEMV4#), indicating that the minimum value MSQn of the SQn is a negative value greater than a predetermined level, the control unit 7 decides that the exhaust valve 14 may be locked in the closing state, as shown in FIGS. 10A to 10E. Therefore, at a step S53, the control unit 7 increments the abnormal counter CEMVNGn of the corresponding cylinder (the second cylinder #2). Following to the execution of the step S53, the routine proceeds to a step S54 wherein the control unit 7 diagnoses that the exhaust valve 14 is locked in the closing state. Thereafter, the routine proceeds to the step S57.

When the decision at the step S52 is negative (NSQn≧LEMV4#), indicating that the minimum value MSQn is generally zero (MSQn≈0), the control unit 7 diagnoses that the intake valve 12 may be locked in the closing state as shown in FIGS. 8A to 8E. Therefore, the routine proceeds to a step S55 wherein the control unit 7 increments the abnormal counter CEMVNGn of the corresponding cylinder (the second cylinder #2) by 1 (CEMVNGn←CEMVNGn+1). Thereafter, at the step S56, the control unit 7 diagnoses that the intake valve 12 is locked in the closing state. Further, the routine proceeds to the step S57.

At the step S57, the control unit 7 decides whether the abnormal counter CEMVNGn is greater than or equal to a fail-safe value LFS# or not. When the decision at the step S57 is affirmative (CEMVNGn≧LFS#), the routine proceeds to a step S58 wherein the control unit 7 turns on an alarm lamp MIL to inform the driver that the variable valve operating system 13, 15 is put in the malfunction state. Then, the control unit 7 outputs a full close command to the intake valve 12 and the exhaust valve 14 to the troubled abnormal cylinder to put the troubled cylinder in the full close state. Thereafter, the routine is terminated.

By the execution of the step S58, when the intake valve 12 is put in the abnormal state, since the exhaust valve 14 is put in the full closing state, this system prevents the intake side and the exhaust side of the engine 1 from being communicated. This firmly prevents the exhaust gas from flowing back to the intake system including the fuel injector. Therefore, the fail-safe function of the diagnosis system is further improved.

With the thus arranged third embodiment, the accurate diagnosis of the variable valve operating systems 13 and 15 is executed on the basis of the detection result of the airflow meter 9 while keeping simple and inexpensive construction without adding special sensors for this diagnosis.

Furthermore, since the diagnosis system according to the present invention is arranged so that the diagnosis is executed on the basis of the target value Q set according to the vehicle driving condition and the accumulated value SQn of the corresponding cylinder #n, the diagnosis system can diagnose the abnormality of the intake valve 12 or the exhaust valve 14 even if the engine operating condition is put in a transient state. That is, with the thus arranged diagnosis system according to the present invention, the diagnosis for specifying the abnormal cylinder and diagnosing the operational abnormality of the intake valve 12 or the exhaust valve 14. As mentioned in the above, an essential feature of the present invention is to specify the abnormal cylinder and the kind of the malfunction thereof such as the inlet or exhaust valve 12, 14 and opening lock or closing lock while maintaining a simple and inexpensive construction of the diagnosis system.

Further, since the diagnosis system of the third embodiment is arranged to send the full close command to the intake valve 12 and the exhaust valve 14 of the corresponding cylinder in case that it is diagnosed that the cylinder #n is abnormal, this system prevents the intake side and the exhaust side of the engine 1 from being communicated. This firmly prevents the exhaust gas from flowing back to the intake system including the fuel injector. Therefore, the fail-safe function of the system is improved.

Although the preferred embodiments of the present invention have been shown and described to comprise the variable valve operating systems 13 and 15, it will be understood that the invention may be applied to an engine system comprising either one of the variable valve operating systems 13 and 15. Further, it will be understood that the present invention is not limited to EMV of the variable valve operating system and may be applied to other valve operating systems such as a type of varying a phase angle between a camshaft and a cam sprocket or a type of variably controlling of opening-and-closing timing of the intake valve 12 by switching a plurality of different cams. Furthermore, the present invention may be applied to conventional cam drive type valve operating systems. If it is applied to a hydraulic lash adjuster employed type, the diagnosis system according to the present invention accurately diagnoses the abnormality of the opening-and-closing abnormality of the intake valve 12 or exhaust valve 14 due to the trouble of a hydraulic system or lash adjuster.

By properly setting the particular period so as to keep the diagnosis accuracy at a predetermined level even during a period when the detection value of the airflow meter 9 is affected by the valve opening-and-closing characteristic of the intake or exhaust valve 12, 14 of the corresponding cylinder #n, the period is not limited to the reference signal Ref (180° crankangle in four-cylinder engine). That is, even if the engine 1 is a four-cylinder engine, the period may change longer or shorter than the 180° crankangle. Further, even in case of other multi-cylinder engines, it is possible to properly set the particular period so as to keep the diagnosis accuracy at a predetermined level even during a period when the detection value of the airflow meter is affected by the valve opening-and-closing characteristic of the intake or exhaust valve of the corresponding cylinder.

In the preferred embodiments according to the present invention, it is preferable that an air-movement distance between the intake valve and the airflow meter 8 is determined so as to minimize the fluctuation among the air-movement distances of the respective cylinders. More specifically, it is preferable to control the unevenness of the air-movement distances within ±10 cm. That is, a time period for generating the change due to the change of the valve characteristics of the intake valve 12 is changed according to the air-movement distance between the intake valve 12 and the airflow meter 9. Therefore, if the difference among the air-movement distances of the respective cylinders is not small, the change due to the change of the valve operation characteristics of the intake valve may generate at a period out of the particular period corresponding the cylinder #n. This will degrade the calculation accuracy of the accumulated value SQn of the corresponding cylinder #n and affect the calculation of the accumulated value of other cylinder so as to degrade the diagnosis accuracy. Consequently, by adjusting the difference among the air-movement distances of the respective cylinders #n, such degradations are prevented.

The entire contents of Japanese Patent Application No. 10-115501 filed on Apr. 24, 1998 in Japan are incorporated herein by reference.

Although the invention has been described above by reference to certain embodiments of the invention, the invention is not limited to the embodiments described above. Modifications and variations of the embodiments described above will occur to those skilled in the art, in light of the above teaching.

What is claimed is:

1. A diagnosis system for an intake/exhaust valve system of an internal combustion engine, comprising:
    an airflow detecting device disposed in an intake passage of the engine, said airflow detecting device detecting actual intake air flow rates of air fed to the engine and outputting signals indicative of the actual intake air flow rates; and
    a control unit coupled to said air flow detecting device, said control unit calculating an accumulated value of the actual intake airflow rates during a particular time period, such that a total amount of the air fed to the engine is estimated, said control unit diagnosing the valve system of the engine on the basis of the accumulated value.

2. A diagnosis system of an intake/exhaust valve system of an internal combustion engine, comprising:
    intake air flow rate detecting means for detecting actual intake air flow rates of the engine;
    intake air flow rate accumulated value calculating means for calculating an accumulated value of the actual intake air flow rates during a particular time period such that a total amount of the air fed to the engine is estimated; and
    valve system diagnosing means for diagnosing abnormality of the valve system on the basis of the accumulated value.

3. A diagnosis system as claimed in claim 1, wherein said control unit diagnoses that the valve system is put in an abnormal state when a ratio of the accumulated value and a target value obtained from an engine operating command is greater than a predetermined value.

4. A diagnosis system as claimed in claim 1, wherein said control unit diagnoses that the valve system is put in an abnormal state when a difference between the accumulated value and a target value obtained from an engine operating command is greater than a predetermined value.

5. A diagnosis system as claimed in claim 1, wherein said control unit calculates a plurality of accumulated values of intake air flow rates, said accumulated values individually corresponding to each cylinder of the engine.

6. A diagnosis system as claimed in claim 5, wherein said control unit diagnoses the valve system by comparing a difference of said accumulated values and a predetermined value.

7. A diagnosis system as claimed in claim 5, wherein said control unit diagnoses the valve system by comparing a ratio of said accumulated values and a predetermined value.

8. A diagnosis system as claimed in claim 5, wherein said control unit diagnoses the valve system by comparing a difference of the accumulated value corresponding to one cylinder and an average value of the accumulated values corresponding to the other cylinders of the engine.

9. A diagnosis system as claimed in claim 5, wherein said control unit diagnoses the valve system by comparing a ratio of the accumulated value corresponding to one cylinder and an average value of the accumulated values corresponding to the other cylinders of the engine.

10. A diagnosis system as claimed in claim 1, wherein said control unit diagnoses that the valve system is locked in an open state when said control unit diagnoses that the valve system is abnormal and that the accumulated value is smaller than a predetermined negative value, said control unit diagnosing that the valve system is locked in a closed state when said control unit diagnoses that the valve system is abnormal and that the accumulated value is greater than a predetermined negative value.

11. A diagnosis system as claimed in claim 1, wherein said control unit specifies a first cylinder associated with an abnormal valve on the basis of an accumulated value of a second cylinder whose intake/exhaust valve movement precedes that of the first cylinder.

12. A diagnosis system as claimed in claim 5, wherein said control unit is further arranged to obtain a minimum value of said accumulated values, said control unit deciding whether an intake valve of the valve system is locked in a closed state or an exhaust valve of the valve system is locked in a closed state by comparing the minimum value with a predetermined value when said control unit has diagnosed that the valve system is put in an abnormal state.

13. A diagnosis system as claimed in claim 1, wherein the particular time period includes a period during which the air flow rate detected by said airflow meter is affected by one of a charging process of the cylinder of the engine and a change in the operation characteristics of an intake valve or an exhaust valve of the valve system of the cylinder.

14. A diagnosis system as claimed in claim 1, wherein the particular time period represents the same duration of crank angle for each cylinder of the engine.

15. A diagnosis system as claimed in claim 1, wherein the valve system of the engine is a variable valve operating system wherein valve opening-and-closing characteristics of at least one of an intake valve and an exhaust valve of the valve system of the engine are variably controlled.

16. A method of diagnosing an intake valve system of an internal combustion engine, comprising:
    detecting actual intake air flow rates of the engine;
    calculating an accumulated value of the actual intake air flow rates during a particular time period, such that a total amount of air fed to the engine is estimated; and
    diagnosing abnormality of the valve system on the basis of the accumulated value.

17. A diagnosis system of an intake/exhaust valve system of a multi-cylinder internal combustion engine, comprising:
    an intake air flow detecting device which is disposed in an intake passage way leading to each cylinder of the engine and which detects air flow rates of the air passing through the air flow detecting device; and
    a control unit coupled to said air flow detecting device, said control unit including:
        a calculating unit which calculates an accumulated value of the intake air flow rates during a specific time period so that an air amount fed into the engine during the specific time period is estimated, wherein each specific time period is predetermined to be unique to each of the cylinders, and
        a diagnosing unit which diagnoses a presence of malfunction of the valve system based on the estimated air amount.

18. A diagnosis system as claimed in claim 17, wherein the engine is a four-cycle engine and the specific time period includes an intake stroke period.

19. A diagnosis system as claimed in claim 13, wherein the particular time period includes said charging process of the cylinder of the engine.

20. A diagnosis system as claimed in claim 16, wherein the particular time period includes a charging process of the cylinder of the engine.

* * * * *